United States Patent [19]

Eidler et al.

[11] Patent Number: 5,315,708

[45] Date of Patent: May 24, 1994

[54] METHOD AND APPARATUS FOR TRANSFERRING DATA THROUGH A STAGING MEMORY

[75] Inventors: Chris W. Eidler, Morgan Hill; Hoke S. Johnson, III, Monte Sereno; Kaushik S. Shah, Santa Clara, all of Calif.

[73] Assignee: Micro Technology, Inc., Anaheim, Calif.

[21] Appl. No.: 42,751

[22] Filed: Apr. 6, 1993

Related U.S. Application Data

[63] Continuation of Ser. No. 886,301, May 21, 1992, abandoned, which is a continuation of Ser. No. 486,535, Feb. 28, 1990, abandoned.

[51] Int. Cl.⁵ .................................................. G06F 5/00
[52] U.S. Cl. ................................. 395/250; 395/425
[58] Field of Search ............... 395/200, 250, 275, 325, 395/425

[56] References Cited

U.S. PATENT DOCUMENTS

| | | | |
|---|---|---|---|
| 3,303,482 | 2/1967 | Jenkins . | |
| 3,544,777 | 12/1970 | Winkler . | |
| 3,693,159 | 9/1972 | Hilberg | 395/425 |
| 3,772,652 | 11/1971 | Hilberg | 395/425 |
| 3,803,560 | 4/1974 | DeVoy | 395/575 |
| 3,824,551 | 7/1974 | Arciprete et al. | 395/275 |
| 3,905,023 | 9/1975 | Perpiglia | 395/575 |
| 3,917,933 | 11/1975 | Scheuneman et al. | 371/10.2 |
| 3,999,163 | 12/1976 | Levy et al. | 395/325 |
| 4,079,449 | 3/1978 | Mercurio et al. | 395/156 |
| 4,093,985 | 6/1978 | Das | 395/575 |
| 4,266,272 | 5/1981 | Berglund et al. | 395/425 |
| 4,339,804 | 7/1982 | Davison et al. | 395/425 |
| 4,345,309 | 8/1982 | Arulpragasam et al. | 395/425 |
| 4,349,871 | 9/1982 | Lary | 395/800 |
| 4,371,928 | 2/1983 | Barlow et al. | 364/200 |
| 4,387,441 | 6/1983 | Kocol et al. | 395/425 |
| 4,392,200 | 7/1983 | Arulpragasam et al. | 395/425 |
| 4,407,016 | 9/1983 | Bayliss et al. | 395/275 |
| 4,417,304 | 11/1983 | Dinwiddie, Jr. | 395/425 |
| 4,435,762 | 3/1984 | Milligan et al. | 395/250 |
| 4,456,994 | 6/1984 | Segarra | 371/15.1 |
| 4,458,316 | 7/1984 | Fry et al. | 395/250 |
| 4,464,747 | 8/1984 | Groudan et al. | 371/50.1 |
| 4,467,421 | 8/1984 | White | 395/425 |
| 4,468,731 | 8/1984 | Johnson et al. | 395/575 |
| 4,490,785 | 12/1984 | Strecker et al. | 364/200 |
| 4,507,730 | 3/1985 | Johnson et al. | 364/200 |
| 4,571,671 | 2/1986 | Burns et al. | 395/250 |
| 4,589,067 | 5/1986 | Porter et al. | 395/800 |
| 4,607,348 | 8/1986 | Sheth | 364/900 |
| 4,644,463 | 2/1987 | Hotchilin et al. | 395/250 |
| 4,667,326 | 5/1987 | Young et al. | 371/39.1 |
| 4,672,613 | 6/1987 | Foxworthy et al. | 371/40.1 |
| 4,722,085 | 1/1988 | Flora et al. | 371/40.1 |

(List continued on next page.)

FOREIGN PATENT DOCUMENTS

| | | |
|---|---|---|
| 0153877 | 2/1985 | European Pat. Off. . |
| 0354073 | 6/1989 | European Pat. Off. . |
| 369707 | 11/1989 | European Pat. Off. . |
| 61-99999 | of 0000 | Japan . |
| 56-88549 | 7/1981 | Japan . |
| 56-94593 | 7/1981 | Japan . |
| 57-111890 | 7/1981 | Japan . |
| 56-163596 | 12/1981 | Japan . |
| 56-169297 | 12/1981 | Japan . |
| 57-111893 | 7/1982 | Japan . |
| 57-195397 | 12/1982 | Japan . |
| 58-83400 | 5/1983 | Japan . |
| 60-156152 | 8/1985 | Japan . |
| WO8400835 | 3/1984 | PCT Int'l Appl. . |

OTHER PUBLICATIONS

W. Jilke, "Disk Array Mass Storage Systems: The New Opportunity", Amperif Corporation, Sep. 30, 1986.

W. Jilke, "Economics Study of Disk Array Mass Storage Systems: The Cost Reduction Opportunity", Amperif Corporation, Mar. 24, 1987.

Primary Examiner—Dale M. Shaw
Assistant Examiner—Dung Dinh
Attorney, Agent, or Firm—Mark D. Rowland; Joseph M. Guiliano

[57] ABSTRACT

A method and apparatus for transferring data from one device interface to another device interface via elements of a staging memory and a direct memory access (DMA) channel.

25 Claims, 8 Drawing Sheets

U.S. PATENT DOCUMENTS

| | | | |
|---|---|---|---|
| 4,744,084 | 5/1988 | Beck et al. | 371/23 |
| 4,761,785 | 8/1988 | Clark et al. | 371/2.2 |
| 4,768,193 | 8/1988 | Takemae | 371/10.3 |
| 4,777,595 | 10/1988 | Strecker et al. | 395/200 |
| 4,817,035 | 3/1989 | Timsit | 395/425 |
| 4,821,185 | 4/1989 | Esposito | 395/275 |
| 4,825,403 | 4/1989 | Gershenson et al. | 360/52 |
| 4,849,929 | 7/1989 | Timsit | 395/575 |
| 4,860,244 | 8/1989 | Bruckert et al. | 395/250 |
| 4,864,495 | 9/1989 | Inaba | 395/250 |
| 4,890,226 | 12/1989 | Itoh | 395/425 |
| 4,914,656 | 4/1990 | Dunphy, Jr. et al. | 371/10.2 |
| 4,935,868 | 6/1990 | DuLac | 395/325 |
| 4,959,433 | 9/1990 | Mercola et al. | 371/32 |

OTHER PUBLICATIONS

Michelle Y. Kim, "Synchronzied Disk Interleaving", IEEE Transactions on Computers, vol. C-35, No. 11, Nov. 1986.

D. Lieberman, "SCSI-2 Controller Board Builds Parallel Disk Drive Arrays", Computer Design, vol. 28, No. 7, Apr. 1, 1989, pp. 32, 36.

W. Meador, "Disk Array Systems", Spring COMPCON 89 Digest of Papers, IEEE Computer Society Press, pp. 143-146.

T. Olson, "Disk Array Performance in a Random IO Environment", Computer Architecture, vol. 17, No. 5, Sep. 1989, pp. 71-77.

D. Patternson et al., "A Case for Redundant Arrays of Inexpensive Disks (RAID)", Report No. UCB/CSD 87/391, Dec. 1987.

D. Patternson et al., "A Case for Redundant Arrays of Inexpensive Disks (RAID)", ACM SIGMOD Conference, Chicago, Ill., Jun. 1-3, 1988.

Product Description, Micropolis 1804 SCSI Parallel Drive Array, Document No. 108120 Rev A.

Program Summary, DataStorage86, An International Forum, Sep. 22-24, 1986, Red Lion Inn, San Jose, Calif.

H. Sierra, "Assessing the Promise of Disk Arrays", Canadian Datasystems, May 1989, pp. 52-53.

D. Simpson, "RAIDs vs. SLEDs", Systems Integration, Nov. 1989, pp. 70-82.

Mike Sisley, "Microprogram Development Technique Adds Flexibility", New Electronics, vol. 17, No. 23, Nov. 27, 1984, pp. 35-38.

J. Voelker, "Winchester Disks Reach for a Gigabyte", IEEE Spectrum, Feb. 1987, pp. 64-67.

METHOD AND APPARATUS FOR TRANSFERRING DATA THROUGH A STAGING MEMORY

This is a continuation of application Ser. No. 07/886,301, filed May 21, 1992, entitled A METHOD AND APPARATUS FOR TRANSFERRING DATA THROUGH A STAGING MEMORY, now abandoned, which is a continuation of application Ser. No. 07/486,535, filed Feb. 28, 1990, now abandoned.

BACKGROUND OF THE INVENTION

The present invention relates to packet-oriented transfers of data and other information in a computer network. More particularly, the present invention relates to a method and apparatus for staging data in elements of a staging memory and for transferring data between a device interface and the elements of a staging memory via a direct memory access (DMA) channel.

Packet switching is a known system for transmitting information such as data, commands and responses over a shared bus of a computer system or network by placing the information in packets having a specified format and transmitting each packet as a composite whole. Long transmissions, such as transfers of large amounts of data, are broken up into separate packets to reduce the amount of time that the shared bus is continuously occupied by a single transmission. Each packet typically includes a header of control elements, such as address bits and packet identification bits arranged in predetermined fields, and may further include error control information.

One known packet-switching method, described in Strecker et al. U.S. Pat. No. 4,777,595, requires that all packet transmissions occur between a named buffer in a transmitting node and a named buffer in a receiving node. The named buffers are in actual memory at each node. To write data from one node to another, the data is placed in packets each labeled in designated fields with the name of the destination buffer in the receiving node and an offset value. The offset value of the packet specifies the location in the receiving buffer, relative to the starting address of the buffer, where the first byte of data in that particular packet is to be stored. A transaction identifier unique to the group of packets also is transmitted in a separate field of each packet. The transaction identifier is used in the process of confirming transmission of the packets.

This packet-switching method has considerable drawbacks in that it requires a node to have a named destination buffer in actual memory for receiving packet transmissions, and further requires that the receiving node identify its named destination buffer to the transmitting node prior to a data transfer. It also has the drawback of requiring that the receiving node be responsive to the contents of the destination buffer name field of a transmitted data packet for directing the contents of the packet to the named buffer. These drawbacks are particularly evident if one attempts to impose them on a receiving node which comprises a resource shared by multiple computers in a network.

For example, consider a mass storage system acting as a shared resource for several computers in a computer network. The mass storage system must often process data transfer requests from more than one computer concurrently, and the data involved in each of these transfers is often sufficiently large to require that it be divided among several packets for transmission over the network communication bus. Depending on the protocol of the communication bus and the relative priorities of the transfers, the mass storage system may receive packets associated with one data transfer between packets associated with another transfer.

Typically, the mass storage system has a memory through which data passes in transit between a network communication bus device interface and a mass storage device interface. This memory may also handle packets having control messages directed between a system processor of the mass storage system and other processors (e.g., remote processors on the network bus or other processors in the mass storage system). The packets containing data or control messages are transferred between the memory and the device interface by one or more DMA channels. Such a DMA channel comprises a high-speed communications interface, including a data bus and control circuitry, for transferring data directly into or out of memory without requiring the attention of a system processor after initial set-up.

If the mass storage system, prior to receiving a data transmission from any one of the computers in the network, were required to allocate a named buffer space in memory to accept the entire data transfer (which may be many packets long), the concurrent processing of several such data transfer requests would require that the mass storage system concurrently allocate a number of separate named buffer spaces equal to the number of concurrent transfers being processed. This preallocation of separate named buffers in the memory of the mass storage system ties up the memory, resulting in inefficient use of available memory and possibly limiting the data throughput of the mass storage system by restricting the number of data requests that can be processed concurrently.

Greater efficiency (in terms of memory use) can be achieved by a more dynamic allocation of memory on a packet-by-packet basis, such that memory space for a particular incoming expected packet is not allocated until the packet is received by the mass storage system. Moreover, efficiency is improved by allowing packets to be stored at any available location in the memory. Such arbitrary, packet-by-packet allocation of memory is particularly suited to the memory of a mass storage system. Unlike transfers of data between actual memory of one computer and actual memory of another computer, transfers of data involving a mass storage system do not use the memory of the mass storage system as a final destination for the data. Rather, as described above, packets containing data are only passed through the memory in transit between the communication bus of the network and the mass storage device or devices of the system. Data comes and goes through the memory in two directions (i.e., into and out of mass storage) arbitrarily, depending on the demands of the computers in the network and the conditions (e.g., busy or idle) of the communication bus, the mass storage devices and the data channels leading to the mass storage devices. As a consequence, the amount and specific locations of memory space used at any particular time, and conversely the amount and specific locations available to receive packets, continually varies. Particular memory locations arbitrarily cycle between available and unavailable states. In such circumstances, preallocation of named buffer spaces in memory is clearly and unnecessarily inefficient.

In view of the foregoing, it would be desirable instead to permit packets to be placed arbitrarily in available memory locations without regard to their source, contents or relationship to other packets—thus allowing the mass storage system to allocate memory locations based on immediate need and immediate availability (i.e., the memory is free to place an incoming packet in whatever memory location happens to be available when the packet is received by the system). Likewise it would be desirable to permit data from the mass storage devices to be transferred to arbitrary locations in the memory in preparation for transmission over the network communication bus—again allowing the mass storage system to allocate memory locations based on immediate need and immediate availability. Of course, it would further be desirable to be able to retrieve data from arbitrary places in memory and to assemble the data in logical order either for transfer to mass storage or for transmission over the network communication bus.

Packet-switching networks are known in the art that do not require a receiving node to identify a named destination buffer prior to transferring a packet from memory to memory. These networks use various methods for directing the contents of packets into the receiving memory such as, for example, by maintaining a software-controlled address table in the memory of the receiving node, the entries of which are used to point to allocated memory locations unknown to the transmitting node. The present invention adopts the principle of such networks in that it is an object of the present invention to provide a method and apparatus for transferring packets between a network communication bus and memory, without allocating or identifying named buffers.

However, known computer systems typically transfer data into and out of contiguous locations in memory to minimize processor interrupts and simplify the transfer process. In known computer systems in which data is stored in disjoint memory locations, a separate processor interrupt is usually required to transfer each non-contiguous segment of data into and out of memory. The present invention is an improvement over such systems in that with respect to the writing of data from memory to a device interface, non-contiguous segments of data stored in the memory are joined by DMA control logic to form a contiguous DMA data transfer to the device interface, and in that, with respect to the reading of data into memory from the device interface, a contiguous DMA data transfer from the device interface is routed by DMA control logic into selected not necessarily contiguous segments of memory in the staging memory. After initial set-up processor attention is not required in either case to transfer the individual data segments until the entire transfer is completed.

SUMMARY OF THE INVENTION

These and other objects and advantages are accomplished by providing a staging memory logically divided into a plurality of addressable elements. Identifiers corresponding to available memory elements are arbitrarily selected by a microprocessor from a pool of such identifiers and are stored in a sequence storage circuit such as a FIFO storage circuit.

The present invention is described in the context of a mass storage system that includes a staging memory for transferring data between a network bus device interface and a mass storage device interface. When a packet is to be received by the staging memory from a device interface connected to the network communication bus, an element identifier is accessed from the sequence storage circuit by DMA control, and the packet is stored in the corresponding location in the memory. The logic indicates that the memory element has received a packet, such as by placing a status word corresponding to the element in a storage register and by generating a control signal such as a processor interrupt signal. The packet is then checked by a system processor of the main storage system to determine if it contains data for mass storage. If the packet does not have data for storage, the system processor notifies other software that a non-data packet has been received. Otherwise, the system processor places information identifying the received packet in a look-up data table. Multiple packets of data can be received into the memory at high speed because the sequence storage circuit can be programmed prior to transfer with multiple element identifiers.

Data stored in the memory elements is transferred to mass storage by a snaking operation which requires only a single intervention by the system microprocessor. By "snaking" the applicants mean combining data from non-contiguous memory locations into a single data transmission. This is accomplished by programming a sequence storage circuit with a series of element identifiers corresponding to memory elements having data to be included in the single data transmission. Under the control of logic separate from and set up by the system processor, the data from the corresponding series of elements is read from the memory and assembled into a data stream of predetermined length for DMA transfer to a mass storage device interface in accordance with the programmed order of the element identifiers in the sequence storage circuit. The data stream comprises header fields, data fields and error correction fields. Any of these fields may exist in the memory, or may be generated by the DMA control logic as a result of instructions provided to the logic by the system microprocessor during set-up. In a preferred embodiment, for example, the control logic pads the last data field in the data stream if necessary to achieve proper block size as defined for transmissions between the memory and the device interface. In addition, any of these fields (e.g., the header fields) may be omitted, or other fields added, depending upon the nature of the data being transferred.

When data is to be read from mass storage, the data is transferred to the staging memory as a single contiguous DMA data stream from a mass storage device interface. The data stream is divided into segments which are stored in selected not necessarily contiguous memory elements of the staging memory in accordance with a series of element identifiers programmed into a sequence storage circuit by the system processor. This process is referred to herein as "desnaking." The element identifiers correspond to available memory elements and are arbitrarily selected by the system microprocessor from a pool of such identifiers. The data is stored under the control of logic separate from and set up by the system processor, such that system processor intervention is not required after initial set-up until the transfer is completed. The system processor keeps track of which memory elements have been programmed to receive which data segments, and when ready to do so sets up logic to retrieve data segments from the staging memory, assemble them into individual packets and provide them to the network bus device interface for transmission over the network communication bus.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
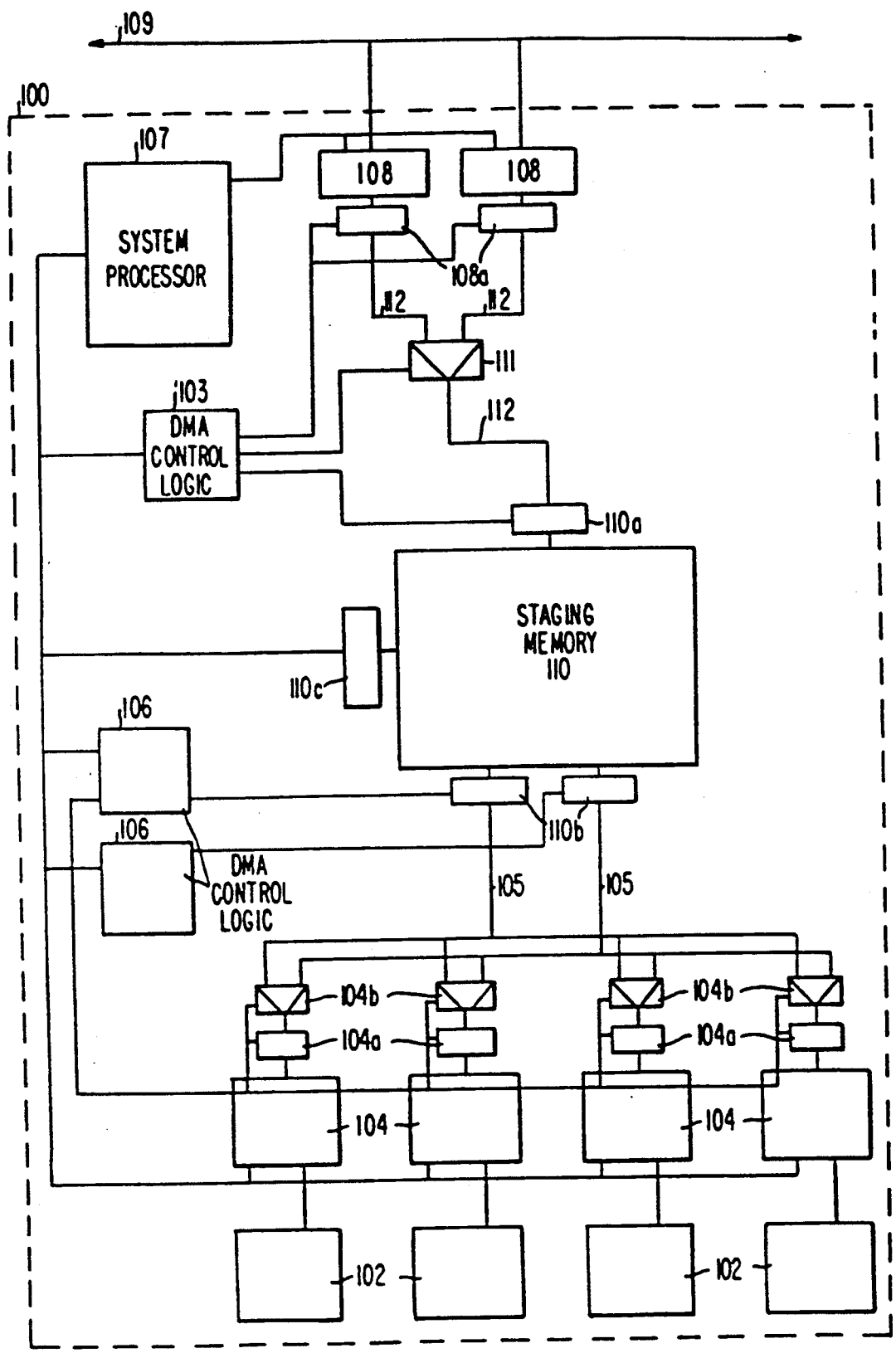
FIG. 1 is a block diagram of a mass storage system including a staging memory in accordance with the principles of the present invention.

FIG. 1 shows a mass storage system 100 that includes one or more mass storage devices 102 (e.g., disk drives or disk drive arrays) and corresponding device interfaces 104 for communicating between devices 102 and other circuitry in mass storage system 100. Mass storage system 100 is connected to a network communication bus 109 via device interfaces 108. There is provided in mass storage system 100 a staging memory 110 for temporarily storing information during a data transfer between the mass storage devices 102 and a host computer attached to network communication bus 109. This staging memory is used, for example, to hold data received from one of either device interfaces 104 or 108 pending readiness of another device interface to receive the data. In the case of a data transfer from a host computer on network bus 109 to a mass storage device 103, the staging memory 110 receives the data from one of device interfaces 108 and holds the data until it is transferred to one of device interfaces 104. In the case of a data transfer from a mass storage device 102 to a host computer attached to network bus 109, the staging memory 110 receives the data from one of device interfaces 104 and holds the data until it is transferred to one of device interfaces 108. Similarly, staging memory 110 may also hold data that is transferred between device interfaces of like kind (e.g., a transfer from one of device interface 104 to another of device interface 104). This same memory may be used for purposes of handling transfers of information other than mass storage data, such as command messages between a host computer connected to network bus 109 and mass storage system 100.

Data transfers in mass storage system 100 are controlled by system processor 107 through DMA control logic components 103 and 106. DMA control logic component 103 controls the transfer of data between device interfaces 108 and staging memory 110. DMA control logic components 106 control the transfer of data between device interfaces 104 and staging memory 110. In the embodiment of FIG. 1, two device interfaces 108 are shown connected to staging memory 110 through a 2:1 multiplexer 111, which in response to a control signal from DMA logic component 103 determines which of the two device interfaces 108 may communicate with staging memory 110. Each of device interfaces 108 includes a port 108a for interfacing with DMA bus 112. Likewise, staging memory 110 includes a port 110a for interfacing with DMA bus 112. DMA control logic component 103 provides control signals to each of ports 108a and 110a and multiplexer 111 to accomplish transfers of data on DMA bus 112. Each of device interfaces 104 has a port 104a for transmitting or receiving DMA data on either of two DMA buses 105 as determined by the setting of corresponding 2:1 multiplexers 104b. The set-up of each of multiplexers 104b is controlled by two DMA control logic components 106. Likewise staging memory 110 includes two ports 110b for communicating with a respective one of DMA buses 105. By providing two DMA busses 105 between device interfaces 104 and staging memory 110 each with a separate DMA control logic component 106, there can be two simultaneous DMA transfers between staging memory 110 and two different ones of device interfaces 104. Each of DMA control logic components 106 provides control signals to ports 104a and 110b and multiplexers 104b to accomplish data transfers on DMA bus 105. In addition to controlling DMA logic components 103 and 105, system processor 107 has direct access to staging memory 110 via port 110c. System processor 107 also has direct access to device interfaces 104 and 108.

As described in greater detail below, DMA control logic component 103 serves the purpose of off-loading data transfer overhead from system processor 107 in connection with a data transfer between staging memory 110 and one of device interfaces 108 after an initial set-up of DMA control logic component 103 and device interface 108. Similarly, also as described in greater detail below, DMA control logic components 106 serve the purpose of off-loading data transfer overhead from system processor 107 in connection with a data transfer between staging memory 110 and one of device interfaces 104 after an initial set-up of the appropriate DMA logic components 106.

Figure 2:
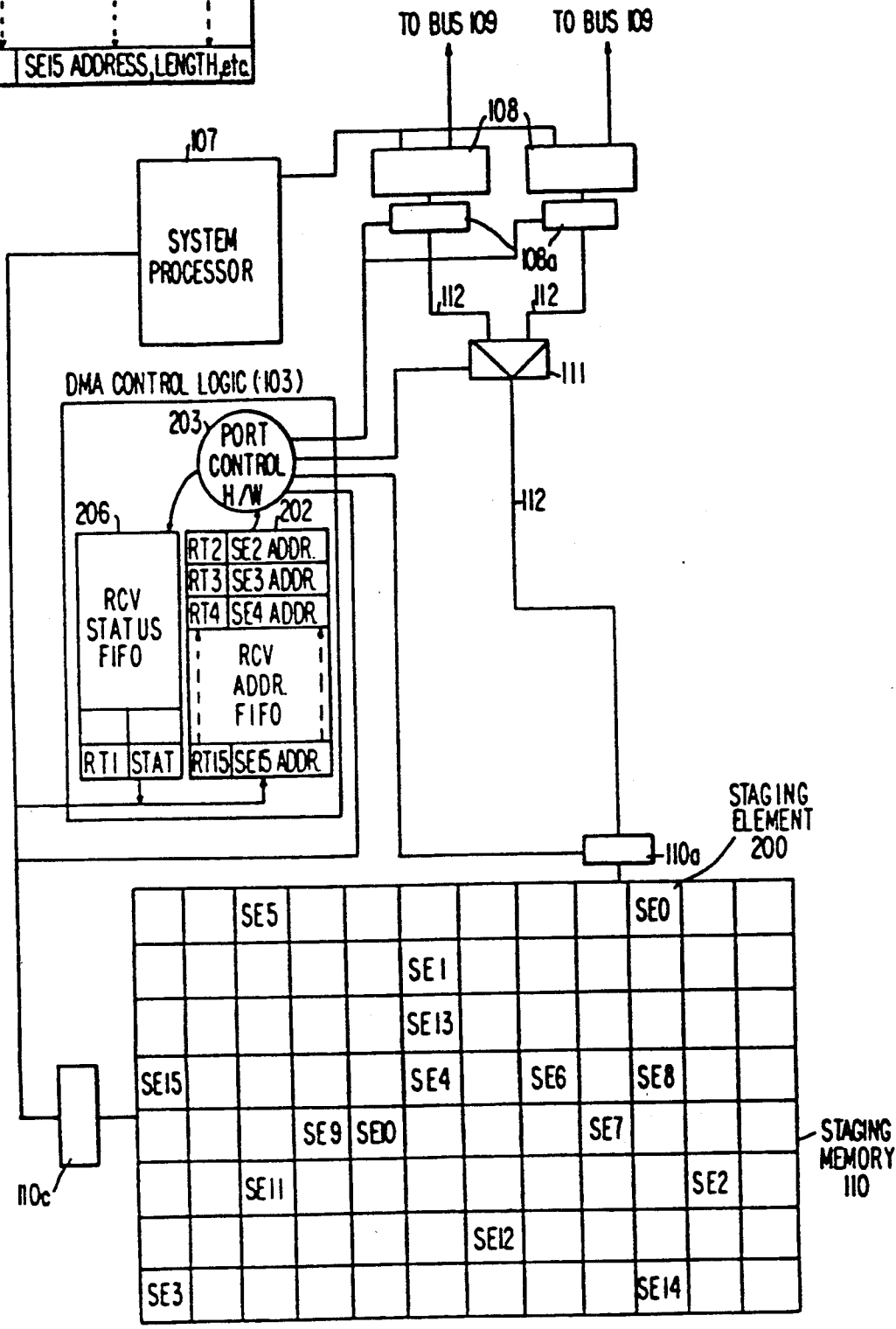
FIG. 2 is a block diagram of an embodiment of the present invention, including a staging memory and receive address and receive status FIFO'S.
Figure 3:
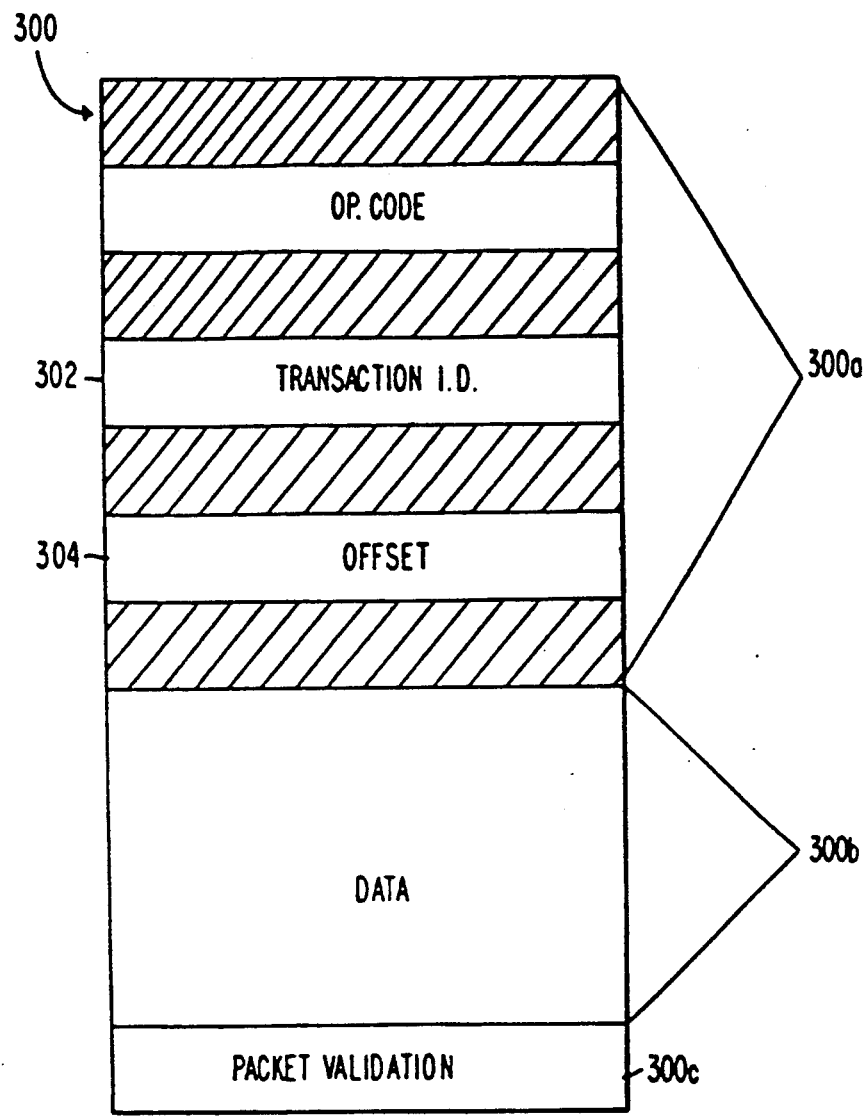
FIG. 3 is a diagram showing the format of a typical data packet of the type known in the prior art and suitable for use with the present invention.

FIG. 2 shows a block diagram of an exemplary embodiment of the packet receiving system of the present invention implemented to receive data packets from device interfaces 108 into staging memory 110. Device interfaces 108 receive information over bus 109 in the form of packets, such as the data packet 300 shown in FIG. 3. The format of these packets typically is defined such that each packet has a known size usually indicated in the header field defined below. and includes three fields, including a packet header or identification field 300a, a data field 300b, and a field 300c for validation information (e.g., CRC information). The actual format of the packets may vary depending on the information processing system in which the packet receiving system of the present invention is used. As will be described in greater detail below, the present invention is capable of accommodating variations in packet size. It is also to be appreciated that the format of data packet 300 may be used to transfer control or status information between a computer and the mass storage system, such that the data field of a packet received by device interface 108 may contain information other than mass storage data, such as control or status information. In packet 300 of FIG. 3, the type of data contained by field 300b (e.g., mass storage data, control or status information) is identified by the OPCODE portion of identification field 300a.

Various schemes are used in conventional information processing systems for referencing individual packets containing mass storage data. One such conventional scheme involves transaction-based packet transfers. Each transaction has a number by which it and each packet included in the transaction are referred to. Where a plurality of packets is included in a particular transaction, the order of the mass storage data in the packets is identified by an offset value equal to the number of words or bytes or other data in it by which the beginning of the mass storage data in each packet is offset from the beginning of the mass storage data in the first packet in the transaction. A transaction identification field 302 and an offset value field 304 are shown in data packet 300 as part of identification field 300a. The exemplary embodiment of the packet receiving system of the present invention described herein is discussed in the context of a network using this type of packet reference. As will be apparent to one of skill in the art, however, embodiments of the present invention can be practiced with other packet identification schemes. Moreover, as will also be apparent, the present invention can be practiced without regard to any particular destination buffer address that may be specified in the packet.

Generally, a transfer of packeted data over a conventional shared system or network bus, such as may be involved in writing data from the memory of a central processor to a mass storage system, is initiated by a command packet from a remote central processor to the mass storage system. For example, in a write transaction, the command packet typically requests the mass storage system to respond by providing a return packet including, among other information, a receiving address, a source address (provided to the mass storage system by the requesting computer) and a transaction identifier. Upon receipt of this response, the remote central processor places the data it seeks to transfer into packets, and places the receiving address and transaction identifier generated by the mass storage system into the corresponding fields of each data packet. The central processor also generates an offset value for each data packet, and typically transmits the data packets in the order of their offset value to the mass storage system.

Because of the multiplexing capability of a packet-switching system, these data packets may be received by the mass storage system interspersed among data packets associated with other transactions. In a typical conventional mass storage system, the data from the received data packets would be placed in contiguous memory locations beginning at the receiving address identified in the address field of the packets plus any offset designated in each packet.

The staging memory 110 of the present invention is useful in a mass storage system to allow received data packets to be stored in memory at noncontiguous locations unknown even symbolically to the remote central processor. Staging memory 110 comprises an addressable memory circuit. The memory elements of staging memory 110 may be implemented using commercially available integrated circuit RAM devices (e.g., devices such as Motorola's 6293 RAM chip). Commercially available register devices also may be used to provide ports 110a, 110b, and 110c. Each port preferably comprises a data latch register, an address counter and a read/write enable register, and may include other logic as may be desired to implement the port functions. Since the purpose of staging memory 110 is to stage network packets, the memory is logically divided by system processor 107 into a plurality of "staging elements" 200, each of which can be described by an address and a length. In this embodiment, all staging elements are of equal length, that length being the maximum expected packet length. This logical division is accomplished by system processor 107 before mass storage system 100 enters an on-line state. System processor 107 divides the size of the staging memory 110 by the maximum expected packet length to determine the number of staging elements 200, and creates a list SE_FREE_POOL in its memory of the starting addresses of each staging element 200.

Figure 4:
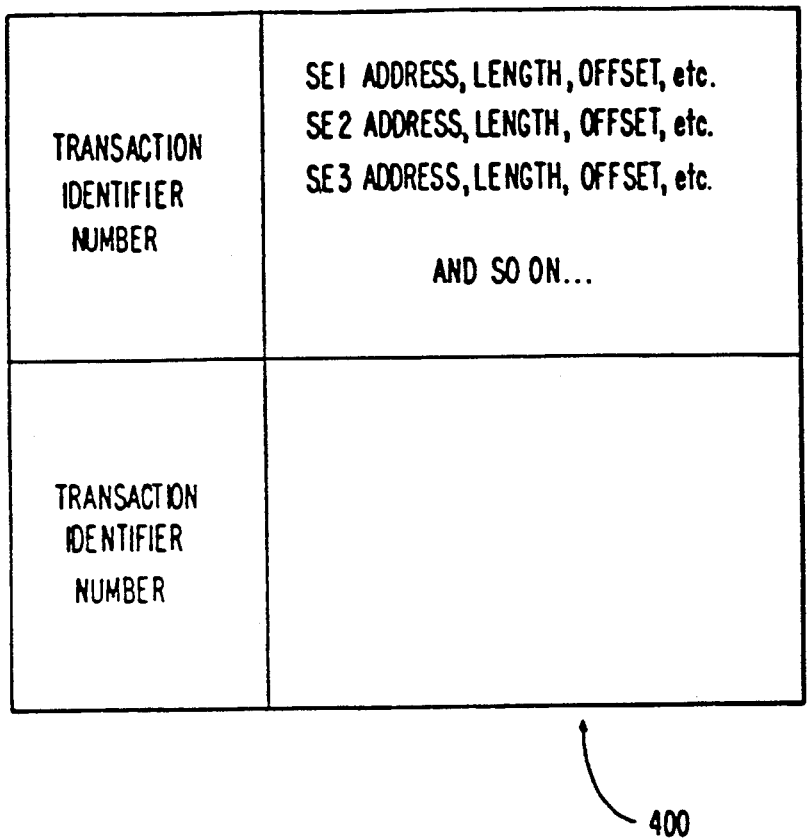
FIG. 4 is a diagram of a data table provided in processor memory to identify memory elements of the staging memory of FIG. 1 that have received data packets from the network communication bus or header/data segments from a mass storage device interface.

When a remote central processor initiates a write operation to mass storage system 100, system processor 107 generates and returns to the central processor, as previously described, a packet including a transaction identifier. System processor 107 also places the generated transaction identifier into a memory-resident table for subsequent use, as described hereafter, in completing outstanding transactions after data is placed in staging memory 110. An example of such a table, described in greater detail below, is shown in FIG. 4.

Prior to a packet transfer transaction, system processor 107 programs a sequence storage circuit 202 in DMA control logic 103 with a series of staging element identifiers. These identifiers correspond to individual staging elements of staging memory 110 which are available to receive packets. They are selected by system processor 107 from the available or currently unused staging elements identified on the SE_FREE_POOL list, and are individually accessed by port control hardware 203 to store data packets received by device interfaces 108 into the corresponding staging elements of staging memory 110. Port control hardware 203 comprises logic, which may be conventionally implemented, such as by using discrete logic or programmable array logic, to manipulate the control, address, and data registers of ports 108a and 110a, and to control multiplexer 111, as required by the particular implementation of these circuits for transferring data between device interfaces 108 and staging memory 110.

In the embodiment of FIG. 2, the sequence storage circuit 202 is implemented using a conventional FIFO (first in first out) storage circuit (labeled RCV ADDR FIFO) in which staging element identifiers stored in the circuit are accessed in the same sequence that they are loaded by system processor 107. The sequence in which the programmed identifiers are accessed by port control hardware 203 can be in a different order if desired (e.g., the identifiers can be accessed in reverse order, such as by using a LIFO circuit—last in first out). In addition, the sequence storage circuit can be implemented by circuitry other than a FIFO or LIFO circuit, such as by using RAM or register arrays, or a microprocessor.

In a preferred embodiment of the present invention, each staging element identifier includes the starting address SE in staging memory 110 of the corresponding staging element. As each address SE is loaded by system processor 107 into RCV ADDR FIFO 202, a short "tag number" RT is joined to the address, and this tag number and the corresponding starting address and length of each staging element loaded into circuit 202 is placed by system processor 107 into a reference table 204. The purpose of the tag number is to provide a short hand reference to each starting address SE loaded into RCV ADDR FIFO 202 for use in generating status words in RCV STATUS FIFO 206. By using the tag number instead of the actual starting address of the staging element in RCV STATUS FIFO 206, the necessary bit-width of FIFO 206 is kept small. The generation of the status words in RCV status FIFO 206 is described below.

Tag numbers are loaded into RCV ADDR FIFO 202 in consecutive order, although another order may be used, as long as the order of tag numbers in RCV ADDR FIFO 202 is reflected by reference table 204. Preferably the tag numbers have values from 0 to (m−1), where m is a parameter variable equal to the depth, or a portion thereof, of RCV ADDR FIFO 202 (i.e., the number of staging element identifiers that can be loaded into RCV ADDR FIFO 202 at one time). For example, if a FIFO circuit having a depth of 16 or more staging element identifiers is used, tag number T may comprise a 4-bit binary number having a value of 0-15. The first staging element address loaded into RCV ADDR FIFO 202 might be assigned a tag number of 0, in which case the second will be assigned 1, etc. In this case, the tag number acts as a modulo-16 counter, such that the next tag number used after 15 would be 0.

System processor 107 reloads RCV ADDR FIFO 202 with starting addresses of currently available staging elements from the SE—FREE—POOL list as the initially loaded addresses are used by port control hardware 203 to receive data packets arriving at device interfaces 108 from bus 109. System processor 107 updates reference table 204 as the system processor reloads RCV ADDR FIFO 202. Preferably, the initial loading of staging element identifiers in RCV ADDR FIFO 202 is done when the mass storage system is initialized. Of course, when a staging element receives a packet, it becomes unavailable until such time as that packet is transferred from the staging element to a mass storage device interface or is otherwise processed, at which time the staging element returns to an available state and is returned to the SE—FREE—POOL list. Thus, during the course of operation of staging memory 110 individual staging elements will cycle between available and unavailable states at various times. System processor 107 keeps track of this cycling process using the SE—FREE—POOL list in order to know which staging elements are available at any given time to load into RCV ADDR FIFO 202.

In the preferred embodiment, device interface 108 checks and strips the CRC information (e.g., validation field 300c) from packets that it receives from bus 109, such that a data segment comprising the header and data fields from each packet received is stored in staging memory 110. After the data segment from each data packet is received by staging memory 110, port control hardware 203 loads a corresponding status identifier into FIFO circuit 206 (RCV STATUS FIFO) to indicate completion of the packet transfer. The status identifier includes a group of STAT bits and the tag number that was assigned in RCV ADDR FIFO 202 to the staging element which received the packet. STAT bits may include, for example, an error bit that indicates whether or not a transmission error was detected by the DMA control logic 103 and a bit indicating which of device interfaces 108 received the packet from bus 109. As with the RCV ADDR FIFO 202, RCV STATUS FIFO 206 can be implemented using conventional circuitry other than a FIFO circuit.

Upon transition of RCV STATUS FIFO 206 from an empty to a non-empty state, an interrupt is generated to system processor 107 to indicate that a packet has been received. In response to the interrupt, system processor 107 reads the tag number of the first status identifier in RCV STATUS FIFO 206 and determines the starting address and length of the corresponding staging element from table 204 (it may not be necessary to list the lengths of the staging elements in table 204 if they are all equal, in which case the length may be stored in a single memory location or register which is read by system processor 107). System processor 107 then places the starting address, length and offset of the packet into table 400 as shown in FIG. 4. The staging element identifier entry in table 204 corresponding to the tag number read from the RCV STATUS FIFO 206 is set to a null value to indicate that there is no longer a valid tag by that number in the DMA control logic 103. Table 400 is indexed according to the transaction identifiers of outstanding transactions, such that for a given transaction identifier, the starting addresses of staging elements having received data packets associated with that transaction are listed by system processor 107 in the order in which the packets of that transaction were received by a device interface 108 or in the order of their offset. Table 400 is used by system processor 107 to complete the transfer of data from staging memory 110 to mass storage device interfaces 104, as described in connection with FIG. 5.

It may be desired that new control information such as logical block address and mass storage device number, for internal use by the mass storage system in completing the transfer to mass storage, be stored in a staging element with the data packet. This can be accomplished simply by having system processor 107 write the new control information over selected portions of the original control elements contained in the header field of the packet after the packet has been placed in staging memory 110. Alternatively, such new control information can be added to the packet data field by DMA control logic 106 as the data fields are transferred from staging memory 110 to mass storage device interface 104.

After system processor 107 accesses the first status identifier in RCV STATUS FIFO 206 in response to an interrupt and places the address of the associated staging element into table 400, system processor 107 checks RCV STATUS FIFO 206 for additional status identifiers, and repeats the accessing process for each such identifier. If there are no more identifiers in RCV STATUS FIFO 206, system processor 107 returns to other operations until interrupted again.

Where a packet arriving into device interface 108 is other than a mass storage data packet, such as a command packet or other type of message, the packet is identified by system processor 107 as being something other than mass storage data. The packet is received into staging memory 110 in the same manner as a mass storage data packet except that system processor 107 does not place the corresponding staging element address into table 400. Instead, system processor 107 provides the staging element address containing the packet to other software in the control circuitry of the mass storage system, which in turn processes the packet and ultimately returns the staging element which contained the packet to the SE—FREE—POOL.

When this system processor detects that all mass storage data packets for a particular write transaction have been received from bus 109, it prepares to transfer the mass storage data to one of mass storage device interfaces 104.

Figure 5:
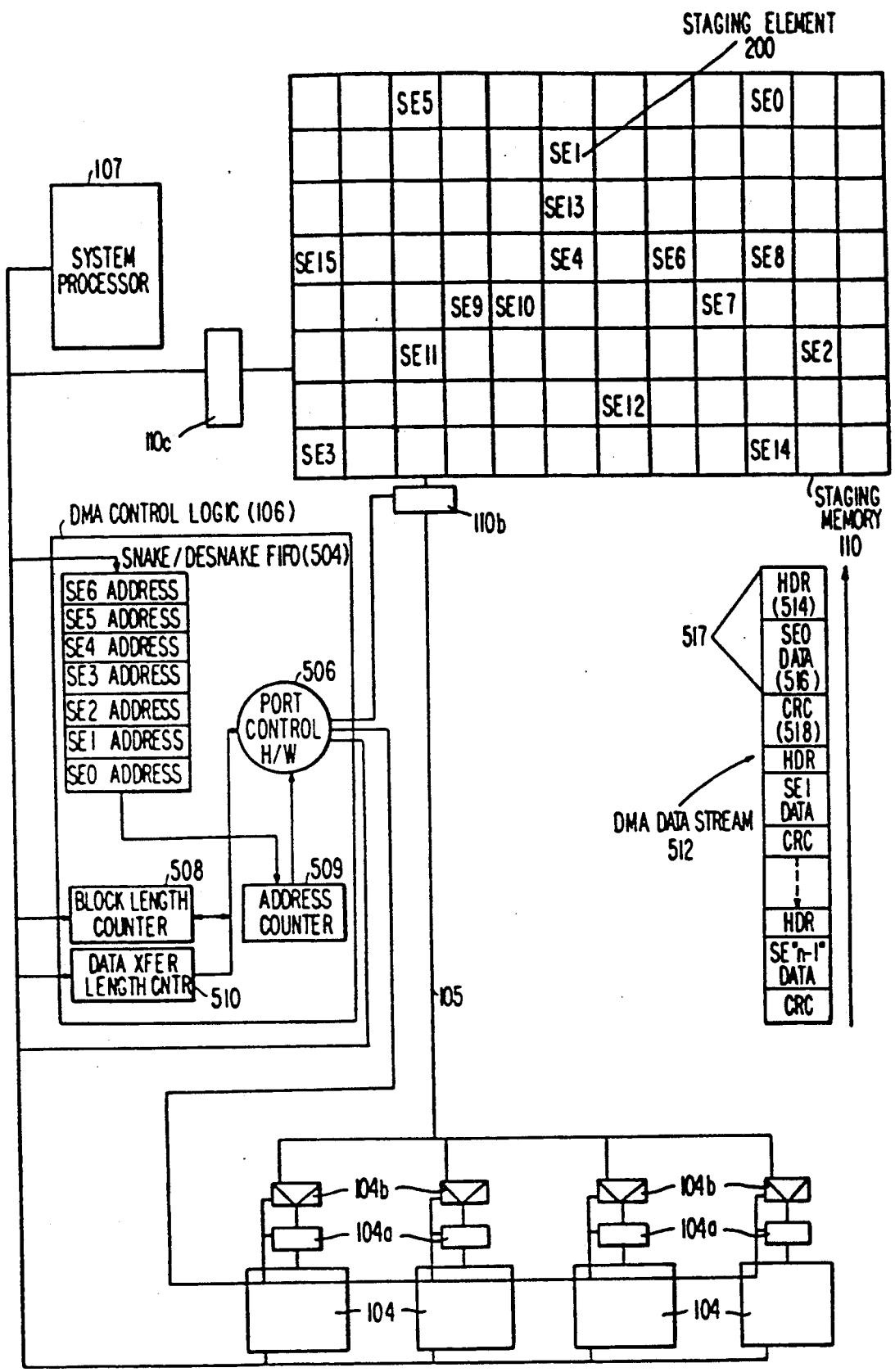
FIG. 5 is a block diagram of an embodiment of the snaking/desnaking system of the present invention, including the staging memory of FIG. 1 and a snaking/desnaking FIFO.

FIG. 5 illustrates an exemplary embodiment of a "snaking/desnaking" mechanism for transferring data between staging memory 110 and a DMA channel 105 connected to mass storage device interfaces 104. The present invention concerns data transfers in both directions over DMA channel 105. The term "snaking" has been previously described herein. First will be described a method for snaking together data stored in selected staging elements of staging memory 110 to transmit the data as a single contiguous DMA data transfer to one of mass storage device interfaces 104.

For purposes of explanation, it is assumed that several packets of mass storage data associated with a single data transfer transaction have been transmitted by a computer to the mass storage system, and have been stored in various staging elements 200 of staging memory 110 in accordance with the packet receiving aspect of the present invention described in connection with FIG. 2. The stored mass storage data packets are of equal length, with the possible exception of the last data segment associated with the transaction, which may have only a fractional amount of mass storage data. Each stored mass storage data packet is modified by system processor 107 to include a header comprising control and addressing information for use in directing the corresponding mass storage data to a particular logical or physical location in mass storage (as previously stated, this information may be written over the control information originally included in the header field of the packet). It is also assumed that system processor 107 has knowledge of the starting memory addresses, lengths and offset values of the data segments to be snaked together. This can be accomplished, for example, by creating a look-up data table like that shown in FIG. 4 when the data is stored in staging memory 110, in the manner previously described.

To transfer the data segments from selected staging elements 200 of staging memory 110 to DMA channel 105, system processor 107 programs sequence storage circuit 504 of DMA control logic 106 with a series of memory addresses ("SE ADDRESS") corresponding to the starting addresses in memory of the modified header fields contained in each of the selected staging elements. Sequence storage circuit 504 is preferably implemented using a FIFO storage circuit (labeled "SNAKE/DESNAKE FIFO") in which staging memory addresses are programmed and accessed in accordance with the offset values of the data segments contained in the corresponding staging elements. The sequence in which the staging memory addresses are programmed (and thus the sequence in which the contents of corresponding staging elements are transferred) can be varied as desired. Sequence storage circuit 504 may be implemented by circuitry other than a FIFO circuit, such as by using a LIFO circuit, RAM or register arrays, or a microprocessor.

After programming sequence storage circuit 504, system processor 107 loads data transfer length counter 510 with a value equal to the total length of data to be transferred. This loading of data transfer length counter 510 initiates the operation of port control hardware 506. Port control hardware 506 comprises a state machine sequence circuit and other logic, which may be conventionally implemented, such as by using discrete logic or programmable array logic, to manipulate the control address and data registers of parts 104a and 110b, and to control multiplexer 104b, and may be constructed in any conventional manner to perform the DMA transfer without requiring further attention from system processor 107. A flow diagram 600 illustrating the states of the state sequence circuit of port control hardware 506 as it executes DMA transfers between staging memory 110 and DMA channel 105 is shown in FIG. 6.

Figure 6:
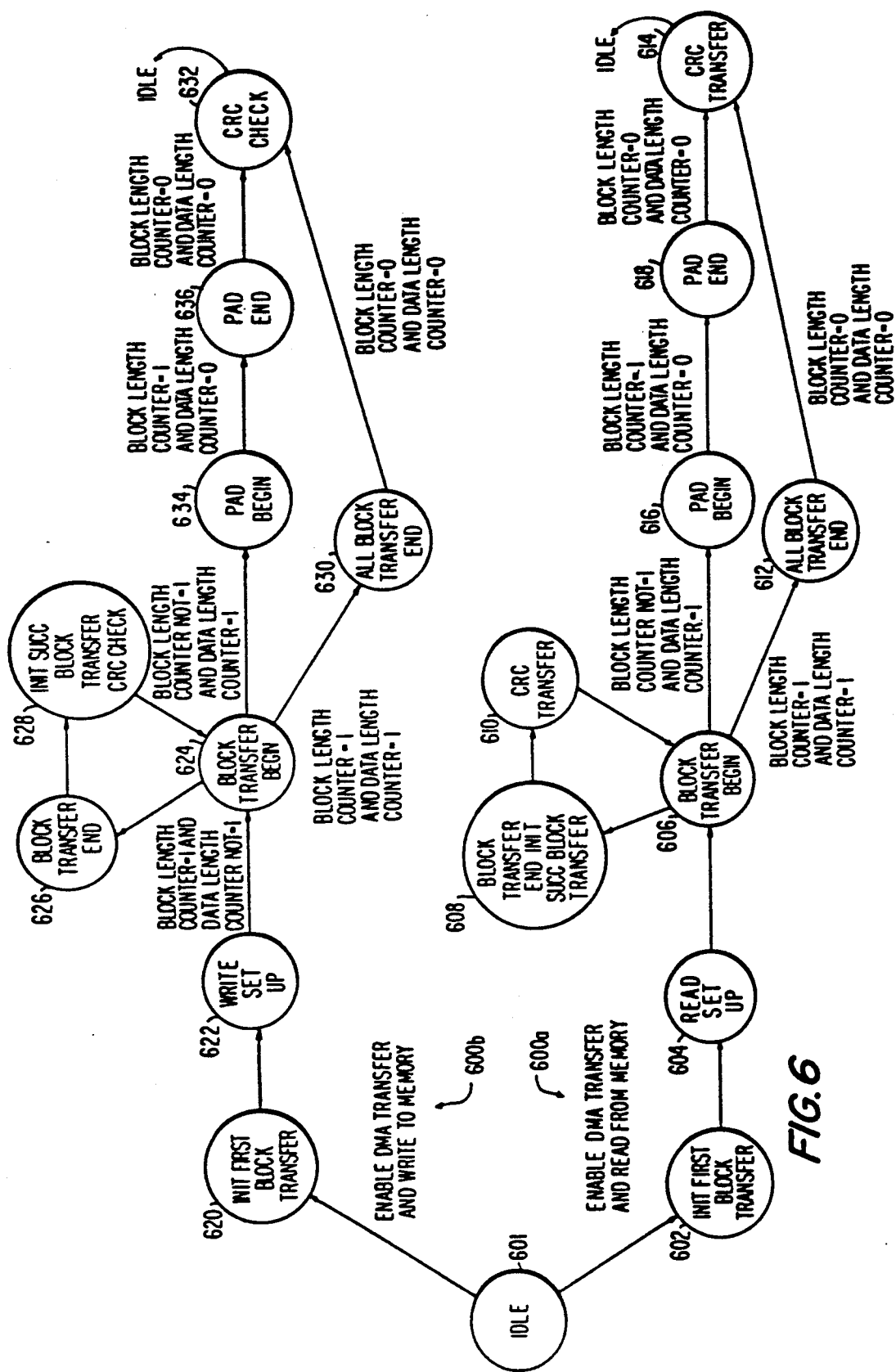
FIG. 6 is a flow diagram of the states of state machine sequence circuit 506 of FIG. 5 during execution of transfers of data between staging memory 110 and DMA channel 105 in accordance with the principles of the present invention.

The states involved in a transfer from staging memory 110 to device interface 104 are shown in the lower portion of FIG. 6, and are generally referred to herein as read sequence 600a. The state machine sequence circuit of port control hardware 506 begins read sequence 600a from an idle state 601 when state machine sequence circuit 506 is initiated by system processor 107 with the loading of data transfer length counter 510. The state machine sequence circuit first loads block length counter 508 with a value equal to the length of each header/data segment (e.g., 520 bytes) in staging memory 110 (excepting fractional data segments) (state 602). The state machine sequence circuit next causes the port control hardware to generate any control signals that may be necessary to set up DMA channel 105, mass storage device interface port 104a and staging memory port 110b for the DMA transfer (state 604).

The state machine sequence circuit of port control hardware 506 then assembles the selected data segments into a single data stream 512 which is transferred over DMA channel 105 to mass storage device interface 104. This may be accomplished as follows. The state machine sequence circuit causes the first staging memory address in sequence storage circuit 504 to be loaded into address counter 509, which provides staging memory port 110b with staging element addresses for directing header/data bytes out of staging memory 110 (state 606). Header 514 and data field 516, comprising a header/data segment 517, are then transferred from the addressed staging element to DMA channel 105.

After each byte is transferred to DMA channel 105, block length counter 508 and data transfer length counter 510 are each decremented by one. Although transfers between staging memory 110 and DMA channel 105 are described herein as taking place one byte at a time, such that block length counter 508 and data transfer length counter 510 are decremented on a byte-by-byte basis, the ports 110b and 104a and DMA channel 105 may be implemented to transfer larger amounts of data in parallel (e.g., longwords). In such case, counters 508 and 510 may be implemented to count longwords or other units rather than bytes. When block length counter 508 reaches zero, indicating that a full header/data segment 517 of 520 bytes has been transferred to DMA channel 105, the state machine sequence circuit directs port control hardware 506 to reload block length counter 508 with the header/data segment length value and to cause the next staging memory address to be loaded into address counter 509 from sequence storage circuit 504 to begin the transfer of another header/data segment (state 608). Before transfer of this next header/data segment begins, the state machine sequence circuit of port control hardware 506 causes data validation information ("CRC" 518) to be appended to data field 516 of the first segment in DMA data stream 512 (state 610). This process (states 606, 608, 610) is repeated until data transfer length counter 510 equals one. If block length counter 508 equals one when data transfer counter 510 reaches one, the last byte of data is transferred and each counter is decremented to zero (state 612). A data validation field is then appended to the just transferred data field (state 614) and the state machine sequence circuit 506 returns to the idle state 601. If block length counter 508 is not equal to one when data transfer length counter 510 equals one (i.e., when the last data byte stored in staging memory 110 is being transferred), block length counter 508 will have a non-zero value after the last stored data byte has been transferred and counters 508 and 510 have been decremented. To complete the last data field of DMA data stream 512 the state machine sequence circuit causes port control hardware 506 to continue transferring bytes of "pad" data on bus 105 as part of the data stream (state 616). This "pad" data comprises a repeating value known as the pad byte. Pad bytes are transferred until the length of the last transmitted header/data segment is equal to the lengths of the previous header/data segments. This is accomplished by decrementing the block length counter after each pad byte is transmitted, and by continuing the padding operation until the block length counter reaches zero. After the last pad byte is transferred and the block length counter is decremented to zero (state 618), a data validation field is transmitted (state 614) to complete the DMA data stream from staging memory 110 to device interface 104.

With respect to a data transfer in which a remote central processor on network bus 109 seeks to retrieve data from mass storage 102 (i.e., a read mass storage data operation), mechanisms similar to those described above can be used to route header/data segments 517 from a single contiguous DMA data stream 512 on DMA channel 105 into available staging elements of staging memory 110, and to then transfer the header/data segments in packet form from staging memory 110 to network communication bus 109 via device interface 108.

The read operation is initiated by a command packet from the remote central processor that provides, among other information, an identification of the mass storage data to be read. The command packet is received by mass storage system 100 via a network bus device interface 108 and is transferred to staging memory 110 in the manner previously described. System processor 107 reads the command packet stored in staging memory 110, and assigns one or more transaction identification numbers to the command. The number of transaction identification numbers used depends on the amount of data requested. System processor 107 then enters the transaction identification numbers into table 400, and notifies the appropriate mass storage device 102 to retrieve the data requested by the command packet.

When the mass storage device 102 is ready to transfer the data associated with a particular transaction identification number, the mass storage device notifies its device interface 104 which in turn causes system processor 107 to be interrupted. System processor 107 determines how many staging elements of staging memory 110 would be required to transfer the mass storage data associated with the transaction identification number and obtains the necessary number of staging elements from the SE_FREE_POOL list. For each staging element, the address in staging memory 110 at which transfer of the header/data segment is to begin is loaded into SNAKE/DESNAKE FIFO 504. The staging element addresses are also entered into table 400 in the order in which they are loaded into FIFO 504.

System processor then selects an available DMA channel 105, and initiates the operation of the state machine sequence circuit within the DMA control logic component 106 associated with the selected channel. Referring now to the states of write (to staging memory 110) sequence 600b, the operation of the state machine sequence circuit is initiated by system processor 107 by loading data transfer length counter 510 with a value equal to the total length of data to be transferred (state 620). The state machine sequence circuit then causes port control hardware 506 to generate any control signals that may be necessary to condition DMA channel 105 and port 110b of staging memory 110 for the DMA transfer (state 622), and loads block length counter 508 with a value equal to the length of each header/data segment 517 to be transferred (state 624).

The state machine sequence circuit of port control hardware 506 next causes the first staging memory address in the sequence storage circuit 504 to be loaded into address counter 509, which provides staging memory port 110b with staging element addresses for directing header/data bytes into staging memory 110 (state 624). A header/data segment 517 is then transferred from mass storage device interface port 104a to the addressed staging element. After each byte is transferred to the staging element, block length counter 508 and data transfer length counter 510 are decremented by one. When a full header/data segment 517 has been transferred to staging memory 110 (state 626), as indicated by block length counter 508 being decremented from one to zero, the state machine sequence circuit of port control hardware 506 checks the data validation field appended to the end of the header/data segment to ensure that the header/data segment was not corrupted during the transfer (state 628). The data validation information is not necessarily stored in staging memory 110, but can be stripped from the header/data segment when checked by the state machine sequence circuit of port control hardware 506. If stripped, new validation information is appended when the header/data segment is later transferred out of staging memory 110. If the state machine sequence circuit of port control hardware 506 detects an error when the data validation information is checked, an interrupt is posted to the system processor 107.

After the data validation information is checked and it is determined that the header/data segment is valid, the state machine sequence circuit directs the port control hardware to reload block length counter 508 with the header/data segment length value and to cause the next staging memory address from the SNAKE/DESNAKE FIFO 504 to be loaded into address counter 509 to begin the transfer of another header/data segment. This process is repeated until the last data byte of the data stream on DMA channel 105 is transferred. When block length counter 508 decrements from one to zero after the last data byte is transferred (state 630), the state machine sequence circuit checks and strips the last data validation field (state 632) and returns to idle state 601.

After the last byte of data is transferred to staging memory 110, DMA control logic 106 interrupts system processor 107 to tell the processor that the transfer of data associated with a transaction identification number has been completed. System processor 107 verifies that the header fields of the header/data segments stored in staging memory 110 indicate that the correct mass storage data has been transferred. System processor 107 then writes new header fields on the stored header/data segments to meet network addressing format requirements, and prepares to transfer the header/data segments to one of device interfaces 108 for transmission in packet form on bus 109.

Figure 7:
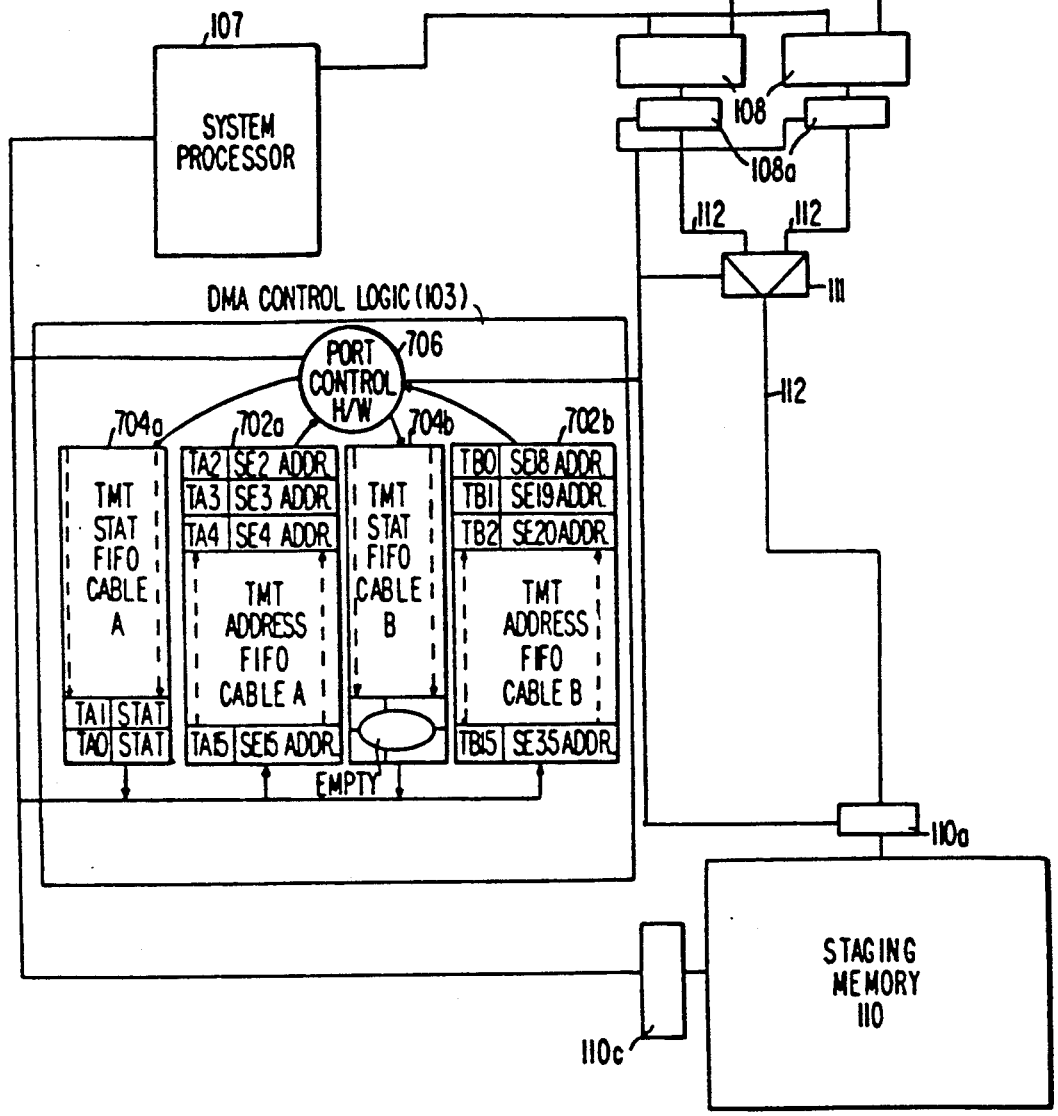
FIG. 7 is a block diagram of an embodiment of the packet transmission system of the present invention, including a staging memory and transmit address and transmit status FIFO's for each network bus device interface.

FIG. 7 illustrates the transfer of data from staging memory 110 to a network bus device interface 108. Prior to transfer, system processor 107 selects one of the two device interfaces 108 and programs the corresponding sequence storage circuit 702a or 702b (labeled TMT ADDR FIFO) with a series of staging element identifiers and enters the staging element addresses and lengths into a corresponding table 705a or 705b. These identifiers correspond to individual staging elements of staging memory 110 that contain data to be transmitted to device interface 108. This sequence is obtained from an entry in table 400 generated during the transfer of data from mass storage device interfaces 104 to staging memory 110. For purposes of illustration, it is assumed hereafter that the device interface for a cable A has been selected by system processor 107. Each identifier preferably comprises the starting memory address of the rewritten header field stored in the corresponding staging element and a tag number TA.

After programming TMT ADDR FIFO 702a, system processor 107 directs the port control hardware 706 of DMA control logic 103 to access the first staging element identifier from TMT ADDR FIFO 702a and to transfer the packet stored in the corresponding staging element to device interface 108. System processor 107 is then free for other processes. DMA control logic 103 repeats the process for each identifier in TMT ADDR FIFO 702a. After each packet is transmitted to device interface 108, DMA control logic 103 loads a corresponding status identifier into FIFO circuit 704a (labeled TMT STATUS FIFO). Here, the status identifier may be expanded to include, in addition to the status bits previously discussed in connection with RCV STATUS FIFO 206, counts of any unsuccessful attempts to transmit. Upon transition of TMT STATUS FIFO 704a from an empty state to a non-empty state, an interrupt to system processor 107 is generated to indicate that a packet has been transferred. System processor 107 checks the status of the transfer of the first packet to device interface 108, and then looks for additional status identifiers. If the status indicates a successful transfer, the entry in table 705a corresponding to the tag number read from the RCV STATUS FIFO 704a is set to a null value. After checking any additional status identifiers in TMT STATUS FIFO 702a, system processor 107 returns to other operations until interrupted again.

It may be desired that data be transferred between staging memory 110 and mass storage device interfaces 104 in header/data segments having a different length than that of the header and data fields of the packets received from bus 109. It may also be that the lengths of the header and data fields of the packets and/or the lengths of header/data segments transferred between staging memory 110 and mass storage device interfaces 104 vary from one to another. In either case, the differences in length can be accommodated by defining the length of staging elements in staging memory 110 to be a variable parameter. In so doing, the variable length of individual staging elements must be taken into account when transferring data to and from staging memory 110.

Figure 8:
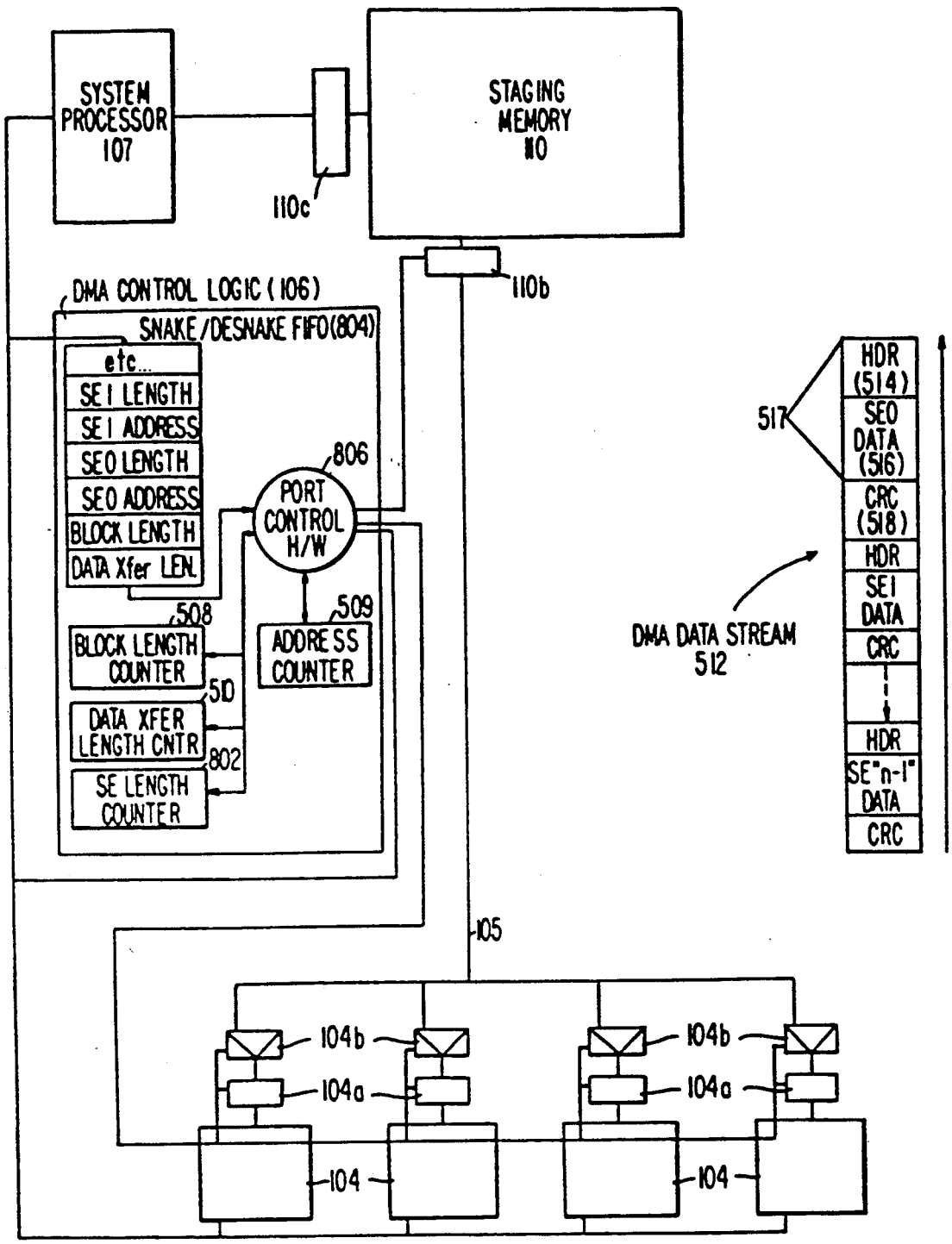
FIG. 8 is a block diagram of an alternative embodiment of the snaking system of the present invention.

For example, FIG. 8 illustrates an alternative embodiment of the snaking/desnaking system of FIG. 5, in which staging element identifiers include a staging element length parameter that is loaded into FIFO 804 along with a corresponding staging memory element address. An additional counter circuit 802 (labeled SE LENGTH CNTR) is provided, into which the staging element length value from FIFO 804 is loaded after the corresponding staging element address is loaded by the port control hardware 806 into the address counter 509. The value of counter 802 is decremented once for each byte of the header/data segment 5.7 transferred to or from staging memory 110, and is used instead of the value of block length counter 508 to determine when port control hardware 506 is to fetch the next staging element address and length from FIFO 804. Block length counter 508 still determines when port control hardware 506 is to insert data validation information ("CRC") into the data stream on DMA channel 105, and padding is carried out in the same manner as previously described.

The use of a staging element length parameter as illustrated in FIG. 8 thus permits the length of the header/data fields of the data transferred between staging memory 110 and mass storage device interfaces 104 to be independent of the length of packets received by mass storage system 100.

Thus a novel method and apparatus for transferring data through a staging memory has been described. One skilled in the art will appreciate that the present invention can be practiced by other than the described embodiments, and in particular may be incorporated in circuits other than the described mass storage system. The described embodiment is presented for purposes of illustration and not of limitation, and the present invention is limited only by the claims which follow.

What is claimed is:

1. In a data processing system, an apparatus for staging data during a transfer of data between at least one device in a first group of devices and at least one device in a second group of devices, the apparatus comprising:
   a staging memory having a plurality of staging elements which when unoccupied are available for storing data transmitted by the first and second groups of devices and first and second port means for accessing the plurality of staging elements;
   first data bus means coupled to the first port means and to the first group of devices for receiving a plurality of data packets comprising a first logical set of data from at least one device in the first group of devices and for transferring the first logical set of data to the first port means of the staging memory in divided portions;
   first programmable staging memory addressing means coupled to the first port means for accessing available staging elements in the staging memory to store the divided portions of the first logical set of data transferred to the first port means in staging elements that are not necessarily contiguous;

second data bus means coupled to the second port means and to the second group of devices for receiving a second logical set of data transmitted by at least one device in the second group of devices and for transferring the second logical set of data of the second port means of the staging memory;

second programmable staging memory addressing means coupled to the second port means for accessing available staging elements in the staging memory to store the second logical set of data in divided portions in a single transmission to staging elements which are not necessarily contiguous; and processor means, coupled to the staging memory and to the first and second programmable staging memory addressing means, the processor means including, means for determining staging elements available for storing divided portions of the first and second logical sets of data, means for programming the first and second programmable staging memory addressing means with staging element identifiers corresponding to available staging elements such that the staging element identifiers are programmed into the first and second programmable staging memory addressing means without prior allocation of any particular staging element to any particular device in the first and second groups of devices, means for storing the staging element identifiers defining staging elements that contain divided portions of the first and second logical sets of data in a logical order for reassembling the first and second logical sets of data when the first and second logical sets of data are retrieved from the staging memory, and means for programming the second programmable staging memory addressing means with staging element identifiers defining the staging elements containing the divided portions of the first logical set of data in a first logical sequence for reassembling the first logical set of data from the divided portions of the first logical set of data and for programming the first programmable staging memory addressing means with staging element identifiers identifying the staging elements containing the divided portions of the second logical set of data in a second logical sequence for reassembling the second logical set of data from the divided portions of the second logical set of data.

2. The apparatus of claim 1, wherein each staging element comprises a group of contiguous physical memory locations characterized by a unique starting memory address and a length, and wherein each staging element identifier comprises the starting memory address and length of the corresponding staging element.

3. The apparatus of claim 2, wherein staging elements in the staging memory have different lengths.

4. The apparatus of claim 1, wherein the staging memory stores the first and second logical sets of data.

5. The apparatus of claim 1, wherein:

the processor means comprises means for, prior to the transfer of the first logical set of data from the staging memory to the second data bus means, determining a block length value defining a number of equally sized data units in each divided portion of the first logical set of data, wherein data unit size is equal to staging element storage capacity and determining a data transfer length value defining a number of the equally sized data units in the first logical set of data; and the second programmable staging memory addressing means comprises means for decrementing the block length value and the data transfer length value by the number of data units transferred as data is transferred from staging elements in the staging memory to the second data bus means.

6. The apparatus of claim 5, wherein the second programmable staging memory addressing means further comprises means for resetting the block length value to the value determined by the processor means when the block length value is decremented to zero and the data transfer length value has a non-zero value.

7. The apparatus of claim 6, wherein the second programmable staging memory addressing means further comprises means for transmitting a padding sequence on the second data bus means when the data transfer length value is decremented to zero and the block length value has a non-zero value, wherein the padding sequence has a length equal to the number of data units indicated by the block length value at the time the data transfer length value equals zero.

8. The apparatus of claim 1, wherein the second programmable staging memory addressing means comprises:

means for generating validation information for each divided portion of the first logical set of data during transfer of the divided portions of the first logical set of data from the staging memory to the second data bus means, wherein the validation information is for validation of the respective divided portion of the first logical set of data when the respective divided portion is read from a device in the second group of devices; and means for transmitting the validation information for each divided portion of the first logical set of data on the second data bus means after the respective divided portion of the first logical set of data is transferred from the staging memory to the second data bus means.

9. The apparatus of claim 8, wherein each divided portion of the first logical set of data being transferred from the staging memory to the second data bus means includes a header comprising transaction identifying information associated with the first logical set of data, and the second programmable staging memory addressing means comprises means for sequentially transmitting the header, data and validation information for each divided portion of the first logical set of data to the second data bus means.

10. The apparatus of claim 1, wherein each divided portion of the second logical set of data transferred from a device in the second group of devices is accompanied by validation information and the second programmable staging memory addressing means comprises means for using the validation information to determine if the corresponding divided portion of the second logical set of data was successfully transferred from a device in the second group of devices to the staging memory.

11. A data processing system comprising:

a first group of devices sharing a first common data bus;

a second group of devices sharing a second common data bus;

staging means for staging a first logical set of data being transmitted from the first group of devices to the second group of devices and a second logical set of data being transmitted from the second group of devices to the first group of devices, the staging means comprising a plurality of staging elements which when unoccupied are available for storing portions of the first and second logical sets of data;

first directing means, coupled to the first common data bus and the staging means, for directing the first logical set of data from the first group of devices to available staging elements in portions and for directing the second logical set of data from the staging means to the first common data bus;

second directing means, coupled to the second common data bus and the staging means, for directing the second logical set of data from the second group of devices to available staging elements in portions and for directing the first logical set of data from the staging means to the second common data bus; and control means, coupled to the first and second directing means and to the staging means, for identifying staging elements available for storing portions of the first and second logical sets of data, for providing information indicative of the available staging elements to the first and second directing means, and for providing the first and second directing means with information for retrieving, respectively, the second and first logical sets of data, the information for retrieving being indicative of staging elements containing the portions of, respectively, the second and first logical sets of data, wherein the information indicative of the available staging elements is provided to the first and second directing means without prior allocation of any particular staging element to any particular device in the first and second groups of devices.

12. The data processing system of claim 11 further comprising memory means, coupled to the control means, for storing information indicative of staging elements that contain portions of the first and second logical sets of data.

13. The data processing system of claim 12, wherein:
the control means comprises means for retrieving the information indicative of staging elements that contain portions of the first logical set of data in a logical sequence for reassembling the first logical set of data and means for providing the retrieved information to the second directing means; and
the second directing means comprises means for accessing the staging elements identified by the information provided by the control means in the logical sequence for reassembling the first logical set of data and means for transferring the first logical set of data to the second common data bus.

14. The data processing system of claim 13, wherein:
the control means further comprises means for retrieving the information indicative of staging elements that contain portions of the second logical set of data in a logical sequence for reassembling the second logical set of data and means for providing the retrieved information to the first directing means; and
the first directing means further comprises means for accessing the staging elements identified by the information provided by the control means in the logical sequence for reassembling the second logical set of data and means for transferring the second logical set of data to the first common data bus.

15. The data processing system of claim 11, wherein each staging element comprises a group of contiguous physical storage locations characterized by a unique starting address and a length, and wherein each staging element identifier comprises the starting address and length of the corresponding staging element.

16. The data processing system of claim 15, wherein staging elements in the staging means have different lengths.

17. In a mass storage system for connection to a network communication bus of a computer network, an apparatus for transferring data between mass storage devices in the mass storage system and the network communication bus in response to a command packet transmitted to the mass storage system by a computer connected to the network communication bus, the apparatus comprising:

first and second network interface means independently coupled to the network communication bus for receiving data from and transmitting data to the network communication bus, the first and second network interface means comprising first and second network interface port means, respectively;

a staging memory comprising a plurality of addressable memory locations, first staging memory port means for selectively accessing the addressable memory locations for transfers of data packets between the network communication bus and the staging memory, and second and third staging memory port means for selectively accessing the addressable memory locations for transfers of data packets between the mass storage devices and the staging memory;

network interface selecting means coupled to the first and second network interface port means and to the first staging memory port means for selectively enabling transmission of data between one of the first and second network interface means and the staging memory;

a plurality of mass storage device interface means, each coupled to a mass storage device, for receiving data from and transmitting data to the mass storage devices, each mass storage device interface means comprising mass storage interface port means;

a plurality of mass storage interface selecting means, each coupled to one of the mass storage interface port means and to the second and third staging memory port means, for selectively enabling transmission of data between the staging memory via one of the second and third staging memory port means and the plurality of mass storage device interface means;

first programmable direct memory access control logic means coupled to the first and second network interface port means, the network interface selecting means and the first staging memory port means for controlling data transfers between the staging memory and the network communication bus;

second programmable direct memory access control logic means coupled to the second staging memory port means, each of the plurality of mass storage device interface means and each of the plurality of mass storage interface port means, for providing a first parallel data channel between the staging memory and the plurality of mass storage devices and for controlling data transfers between the staging memory and the plurality of mass storage devices in the first parallel data channel;

third programmable direct memory access control logic means coupled to the third staging memory port means, each of the plurality of mass storage device interface means and each of the plurality of mass storage interface port means, for providing a second parallel data channel between the staging memory and the plurality of mass storage devices and for controlling data transfers between the staging memory and the plurality of mass storage devices in the second parallel data channel; and processor means, coupled to the first and second network interface means, the staging memory, the first, second and third direct memory access control logic means and each of the plurality of mass storage device interface means, for initializing the mass storage system, for receiving read and write commands from the computer network via one of the first and second network interface means, and for controlling the first and second network interface means, the staging memory, the first, second and third programmable direct memory access control logic means, and each of the plurality of mass storage device interface means to transfer data via the staging memory from at least one of the plurality of mass storage device interface means to one of the first and second network interface means when a read command is received, and from one of the first and second network interface means to at least one of the mass storage device interface means when a write command is received.

18. The apparatus of claim 17, wherein the processor means comprises:

means for defining a plurality of staging elements in the staging memory during initialization of the mass storage system;

means for identifying staging elements in the staging memory that are available for storing data;

means for maintaining in a processor memory coupled to the processor means a list of staging element identifiers defining staging elements available for storing data;

means for selecting from the stored list of staging element identifiers a series of staging element identifiers;

means for providing the first direct memory access control logic means with the selected series of staging element identifiers; and means for generating information uniquely identifying each transfer of a logical set of data in progress involving the staging memory and storing the information in the processor memory.

19. The apparatus of claim 18, wherein the information uniquely identifying each transfer of a logical set of data involving the staging memory is a transaction number.

20. The apparatus of claim 19, wherein command and data packets transmitted to the mass storage system from the computer network are received by one of the first and second network interface means and are transferred automatically into the staging memory by the first direct memory access control logic means into staging elements determined by the series of staging element identifiers provided by the processor means, and the processor means further comprises means for distinguishing between command packets and data packets, and when a data packet is detected, the processor means stores in the processor memory the transaction number associated with the logical set of data from which the data packet is derived and the staging element identifier associated with the staging element containing the data packet, such that transaction numbers and staging element identifiers associated with each logical set of data are stored in a logical order for reassembling the logical set of data when the logical set of data is retrieved from the staging memory.

21. The apparatus of claim 17, wherein each staging element comprises a group of contiguous physical memory locations characterized by a unique starting memory address and a length, and wherein a staging element identifier comprises the starting memory address and length of the corresponding staging element.

22. The apparatus of claim 21, wherein staging elements in the staging memory have different lengths.

23. A method of staging data in a staging memory during a transfer of data between at least one device in a first group of devices and at least one device in a second group of devices, the method comprising the steps of:

defining in the staging memory a plurality of staging elements which when unoccupied are available for storing data transmitted by the first and second groups of devices;

determining staging elements in the staging memory that are available for storing data in divided portions from devices in the first and second groups of devices;

providing first and second groups of staging element identifiers defining staging elements available for storing divided portions of data transmitted by, respectively, the first and second groups of devices to, respectively, first and second staging memory port controllers without prior allocation of any particular available staging element to any particular device in the first and second groups of devices, wherein the first staging memory port controller is coupled to a first data port of the staging memory and the second staging memory port controller is coupled to a second data port of the staging memory;

directing a first logical set of data transmitted by at least one device in the first group of devices in a plurality of divided portions to the first data port of the staging memory via a first data bus connecting the first group of devices to the first data port;

storing the divided portions of the first logical set of data in available, not necessarily contiguous staging elements identified by the first group of staging element identifiers provided to the first staging memory port controller;

directing a second logical set of data transmitted by at least one device in the second group of devices in a plurality of divided portions to the second data port of the staging memory via a first data bus connecting the second group of devices to the second data port;

storing the divided portions of the second logical set of data in available, not necessarily contiguous staging elements identified by the second group of staging element identifiers provided to the second staging memory port controller;

maintaining in a control memory coupled to the first and second staging memory port controllers, a list of the first and second groups of staging element identifiers defining staging elements that contain, respectively, the divided portions of the first and second logical sets of data;

transferring the first group of staging element identifiers from the control memory to the second staging memory port controller in a first logical sequence for reassembling the first logical set of data from the divided portions of the first logical set of data; and transferring the second group of staging element identifiers from the control memory to the first staging memory port controller in a second logical sequence for reassembling the second logical set of data from the divided portions of the second logical set of data.

24. The method of claim 23 further comprising the step of accessing in accordance with the first logical sequence the staging elements containing the divided portions of the first logical set of data.

25. The method of claim 24 further comprising the step of accessing in accordance with the second logical sequence the staging elements containing the divided portions of the second logical set of data.

* * * * *